United States Patent Office 2,696,132
Patented Dec. 7, 1954

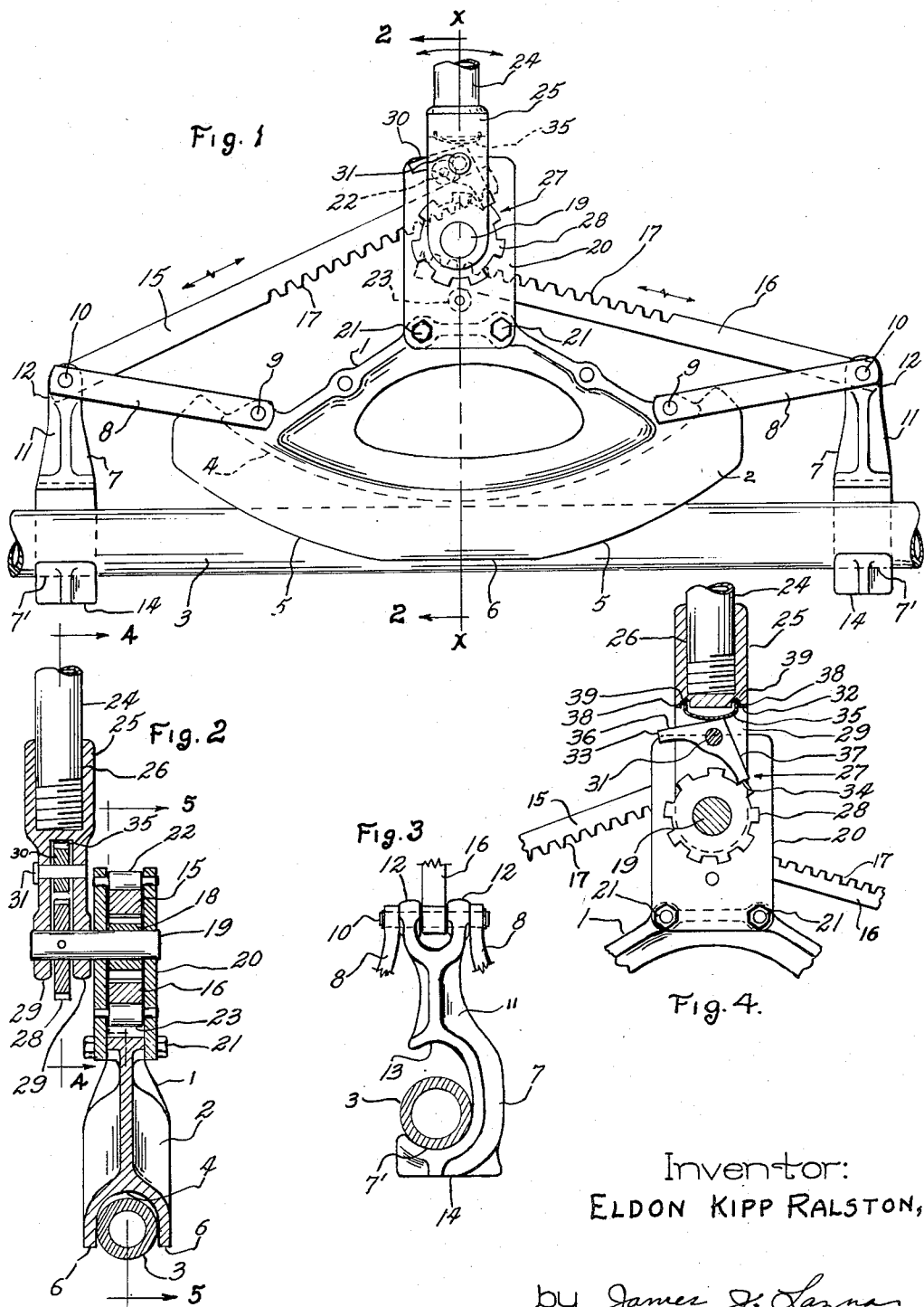

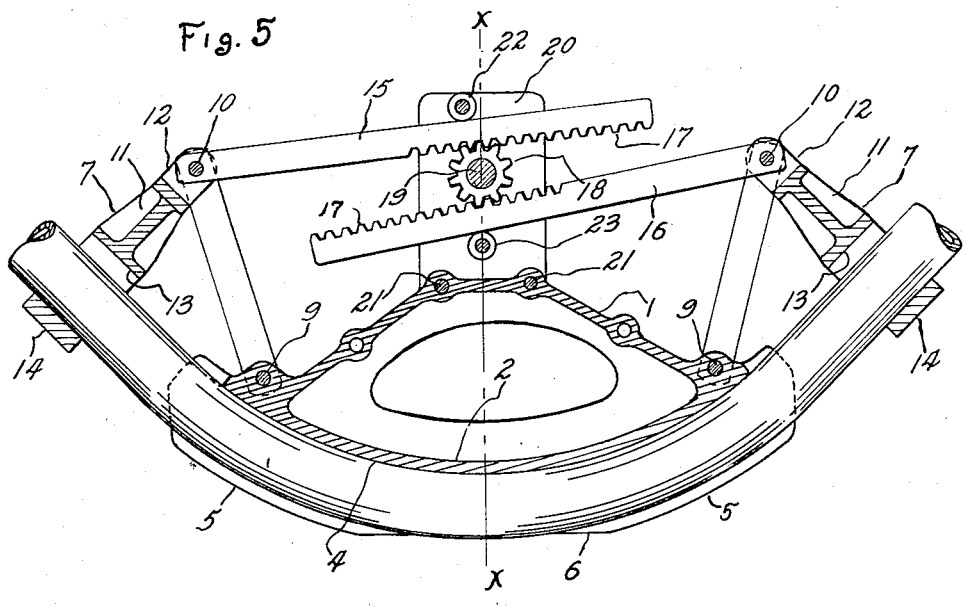
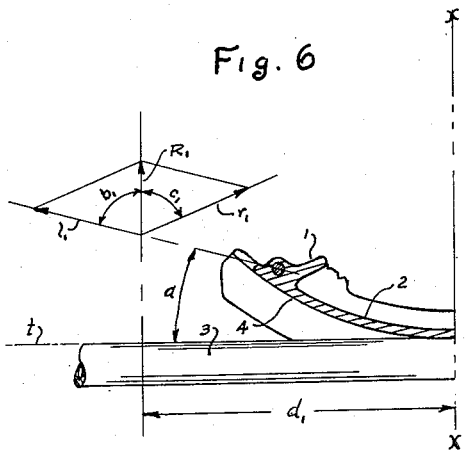
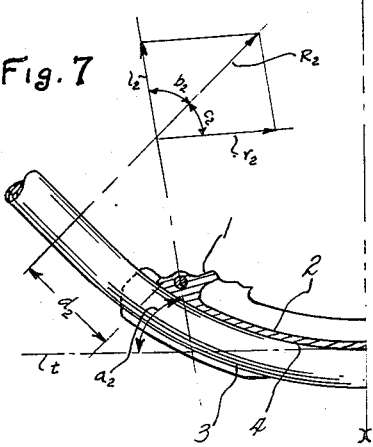

2,696,132

DRAW-LINK ACTUATED PIPE BENDER

Eldon Kipp Ralston, Lyndhurst, Ohio, assignor to Solon Manufacturing Company, a corporation of Ohio Application March 13, 1951, Serial No. 215,315

6 Claims. (Cl. 81—15)

My invention relates in general to apparatus for bending pipe or conduit and the like, and more particularly to a heavy-duty manually-operable pipe bender adapted especially for use in bending comparatively large size pipe or conduit.

Up to the present, the only type pipe benders available for bending relatively large size metal pipe or conduit such as, for example, the commonly known 1¼ and 1½ inch size pipe or conduit, have either been of the hydraulic type which are relatively heavy and cumbersome, and quite expensive, or of the mechanical "bench" type which are likewise heavy and hard to operate and have to be fastened firmly to a bench when in use. With such type benders, therefore, all of the pipe or conduit to be bent usually is brought to the place where the bender is set up, which often is at a point considerably removed from the location where the pipe is to be installed, thus occasioning considerable inconvenience and waste of time and effort as well as added expense. Moreover, with some type mechanical benders, the manual applied force required to effect the bending of the pipe increases as the bending operation progresses and is appreciably greater at the end of the bending operation than it is at the start thereof, thus rendering such benders very hard to operate during the latter stages of the bending operation.

It is an object of my invention, therefore, to provide a mechanically operating heavy-duty pipe or conduit bender which is of simple, light weight, and very inexpensive construction and which is highly portable so that it can be conveniently carried about by the worker from place to place and readily operated at the immediate location where the pipe or conduit is to be installed.

Another object of my invention is to provide a mechanically operating portable pipe or conduit bender which is easily operated with a minimum amount of physical effort and which is more or less uniformly easy to operate throughout the entire bending operation from beginning to end.

Still another object of my invention is to provide a mechanically operating pipe or conduit bender having a grooved forming shoe and provided with an ejector arrangement for readily freeing or loosening the bent pipe or conduit from the groove of the forming shoe.

A further object of my invention is to provide a mechanical pipe bender of the handle-actuated drive shaft type which is characterized by very low shaft bearing loads during operation such as serve to minimize the actuating force required to operate the bender.

A feature of the invention is the use, in combination with a stationary arcuate forming shoe, of movable pipe holders or hooks mounted on the forming shoe at opposite ends thereof to bend the pipe therearound and actuated by means operating to apply to the hooks and the pipe engaged thereby a progressively greater bending force during the bending operation which substantially offsets the attendant progressive shortening of the moment arm of the bending force applied to the pipe by the hooks, thus rendering the bender just as easy to operate during the latter stages of the bending operation as at the start thereof. A specific feature of the invention is the use of links pivotally connecting the hooks to the forming shoe, and rack gears likewise pivotally connected to the hooks and links at the pivotal connection therebetween to actuate the hooks and gear meshed with a handle-operated drive or pinion gear rotatably mounted on the forming shoe, the links and rack gears being so arranged with respect to the pipe engaging hooks as to act in the manner of a toggle mechanism to exert a resultant force on the hooks of progressively increasing magnitude during the bending operation, for a substantially constant operating force applied to the operating handle.

Further objects and advantages of my invention will appear from the following detailed description of a species thereof and from the accompanying drawing.

In the drawing, Fig. 1 is an elevation of pipe-bending apparatus according to my invention; Fig. 2 is a vertical section on the line 2—2 of Fig. 1; Fig. 3 is a partial end view of the said apparatus showing, in side elevation, one of the pipe holders thereof; Fig. 4 is a section on the line 4—4 of Fig. 2; Fig. 5 is a longitudinal section on the line 5—5 of Fig. 2 showing the parts in position at the completion of the bending operation; and Figs. 6 and 7 are diagrammatic views illustrating the force diagrams and resultant bending forces applied to the pipe by the pipe holders at the start and end, respectively, of the bending operation.

Referring to the drawings, the pipe or conduit bender according to the invention comprises a body or sector member 1 preferably in the form of a casting of suitable material such as malleable iron. The body member 1 is provided with a curved or arcuate shoe portion 2 around which the pipe or conduit 3 is bent during the operation of the device, the shoe 2 having an arcuate length of at least a 90° included angle in order to permit the formation of bends up to at least the 90° bend most commonly used in practice. As shown in Fig. 2, the shoe 2 is of U-shaped transverse section providing an outwardly facing forming groove 4 which is of generally semi-cylindrical shape conforming approximately to but of slightly larger width than the outside diameter of the particular size pipe or conduit to be bent, and within which groove the pipe is received during the bending thereof. The rims or edges 5 of the shoe, bordering the groove 4 therein, are similarly flattened throughout a considerable extent of the length of the shoe at the central region thereof, as indicated at 6, to provide rest surfaces enabling the body member 1 to stand upright on the floor or other flat work surface.

Pivotally mounted on the body member 1 opposite the respective ends of the shoe 2, so as to swing approximately parallel to the plane of the forming groove 4, are pipe holder means comprising a pair of hooks or holders 7, 7 which are provided with semi-cylindrical seat portions 7′, 7′ conforming more or less to the curvature of and adapted to receive and hold the pipe or conduit 3 to be bent and bend it around the arcuate shoe 2. The pipe holders or hooks 7, 7 are each supported from the body member 1 by link means preferably each comprising a pair of swing links 8, 8 disposed on opposite sides of the body member 1 and pivotally connected at their opposite ends to the adjacent end of the body member 1 and to the shank end of the respective hook 7 by pivot pins 9 and 10, respectively, which extend crosswise of the shoe 2 and its groove 4 so as to permit both the links 8 and hooks 7 to swing approximately parallel to the plane of the shoe 2 or its groove 4, or in other words parallel to the bending plane of the pipe 3. As shown in Fig. 3, the shanks 11 of the hooks 7 terminate in bifurcated or forked ends providing spaced arms 12, 12 through which the pivot pins 10 pass to pivotally interconnect the hooks and the swing links 8. The hooks 7 are preferably formed with overhanging pipe-ejecting shoulder portions 13 which, on the return of the hooks to their starting position, serve to engage and force the bent pipe out of, and dislodge or free it from the forming groove 4 at the conclusion of the bending operation, the pipe normally tending to wedge within the groove during the bending operation by reason of the slight flattening or widening of the pipe which occurs at such time. The underside of the hooks 7 are formed with flat bearing or rest surfaces 14 which serve to initially support the bending apparatus upright on the floor or other flat working surface, in position to receive the pipe or conduit 3 to be bent, as shown in Fig. 1.

The pipe holders or hooks 7, and their support link means 8, are swung about their pivots 9, to thereby bend the pipe or conduit 3 around the curved shoe 2, by actuating draw means comprising a pair of tension members or draw arms 15, 16 which are connected to respective link means 8 and hooks 7 and are longitudinally shifted or pulled inwardly towards each other in the general direction of the center of curvature of the shoe 2 to exert a pulling force on the hooks 7 and link means 8 and thus effect the swinging movement thereof. As shown, the tension members or actuating draw arms 15, 16 are preferably in the form of rack bars having a pivotal connection at one end with their respective hooks 7 and link means 8, the pivotal connection preferably being provided by the pivot pins 10 which thus constitute common pivot connections between the said parts. If desired, however, the rack gears 15, 16 and their respective link means 8, which together constitute the support means for the pipe holders 7, may be separately connected to the holders 7 or they may have a pivotal interconnection separate from but adjacent to the pivotal connection of the pipe holders 7 to their said support means, in which latter case the holders 7 may be pivoted either to the link means 8 or to the rack gears 15, 16. At their other ends, the rack gears 15, 16 are formed with teeth 17 which are in meshed engagement with a small pinion drive gear 18 (Fig. 5) fastened to a shaft 19 journaled in upstanding spaced bearing plates 20, 20 suitably secured, as by bolts 21, to the inward or concave side of the sector or body member 1, i. e., opposite the curved shoe portion 2 thereof. As shown in Fig. 2, the rack bars 15, 16 extend between the spaced bearing plates 20, 20 and are in gear-meshed engagement with opposite sides of the pinion drive gear 18 so that the rack bars are simultaneously moved either longitudinally inward toward each other or outwardly away from each other by the said gear depending on the direction of rotation thereof. The drive gear 18 is likewise located in the space between the plates 20, 20, the rack bars 15, 16 being confined between the said plates to thereby maintain them in gear-meshed relation with the gear 18 crosswise of the face thereof. As shown in Fig. 5, the rack gears 15, 16 are held against the drive gear 18 and in gear-meshed engagement therewith by upper and lower guide rollers 22 and 23, respectively, which are located between and rotatably mounted on the plates 20, 20 and against and on which the rack gears bear and ride freely when they are longitudinally shifted back and forth, i. e., advanced and retracted, between the said rollers and the drive gear 18 by rotation of the latter. The actuating shaft 19 is mounted with its axis of rotation located inwardly of or to the concave side of the curved shoe portion 2, and in the particular case shown it is located approximately on the medial radius or center line $x-x$ of the sector member 1 at a point intermediate the shoe portion 2 and the center point of curvature of that portion of the shoe at the region of the said center line $x-x$ thereof, preferably however slightly nearer to the said center point of curvature.

The actuating gear 18 and its shaft 19 are rotated, to thereby actuate the rack bars 15, 16 and draw the pipe holder hooks 7 inwardly of the shoe 2, by suitable operating means fastened to the said shaft, preferably by means of a handle or hand lever 24 for manually applying sufficient leverage to bend the pipe. The handle 24 may be secured to the shaft 19 by a support arm 25 fastened to the said shaft and provided with a socket 26 for the handle within which socket the handle is suitably held in place, as by being screwed thereinto as shown, or by means of a set screw. Since it is necessary to rotate the actuating gear 18 and its shaft 19 through considerably more than half a turn in order to bend the pipe 3 around the entire curved extent of the shoe 2 to form a 90° bend therein, it is preferable, in the case where a hand lever or handle 24 is employed, to provide means such as a conventional type reversible ratchet mechanism 27 for enabling the rotation of the shaft 19 simply by swinging the handle back and forth through a series of successive short strokes. As shown particularly in Figs. 2 and 4, the ratchet mechanism 27 comprises a ratchet wheel 28 which is fastened on the shaft 19 in a position between the two depending spaced ears 29, 29 with which the handle support arm 25 is formed. A pawl or detent 30 is pivotally mounted, by means of a pivot pin 31, on the said arm 25 in a position between the ears 29 thereof and between the ratchet wheel 28 and the underside 32 of the handle socket portion 26 of the arm 25. The pawl 30 is so located relative to the ratchet wheel 28 as to permit swinging movement of the pawl into one or the other of two alternate ratcheting positions, wherein one or the other of its ends 33 or 34 (Fig. 4) engages the teeth of the ratchet wheel to lock the latter and its associated shaft 19 against rotative movement in one direction or the other. The pawl 30 is yieldably held in either one of its said ratcheting positions, as shown in Fig. 4, by means of a plate spring 35 which is mounted on the under wall 32 of the handle socket portion 26 of arm 25. The spring 35 is bowed outwardly away from the wall 32 and yieldingly bears against one or the other of the angularly extending upper bearing surfaces 36, 37 of the pawl to exert spring pressure thereon tending to rotate the pawl and hold it either in ratcheting position for bending the pipe around the shoe 2 (as shown in Fig. 1) or in ratcheting position for returning the pipe holders 7 to their initial starting position. The spring 35 is provided at its opposite ends with bent-up tongues 38, 38 which are received within recesses 39, 39 in the wall 32 and are spring pressed outwardly against the sides of said recesses, by the tendency of the bowed spring to flatten out, to thereby hold the spring in place on the wall 32.

In the normal starting or retracted position of the bending apparatus as shown in Fig. 1, the body member 1 and the pipe holders or hooks 7, 7 are positioned upright, with the semi-cylindrical seating portions 7', 7' of the hooks substantially alined with one another and with the midsection of the arcuate forming groove 4 (i. e., at the center line $x-x$) so as to receive and hold a straight length of pipe or conduit 3 within and substantially tangent to the groove at its approximate midpoint but preferably spaced a slight distance of the order of around ⅛ inch or so from the bottom or base of the groove at the point of tangency, as shown in Figs. 1 and 2. In such normal starting position, the links 8 extend outwardly from their respective pivot supports 9 at a slight diverging angle $a$ (Fig. 6) of, for instance, around 10° to 20° or so to the length of straight pipe 3 in the holders 7 so as to exert a force $l_1$ on said holders having an upward component directed normal to the pipe in a direction to bend it around the curved shoe 2, when the rack gears 15, 16 are drawn inward. Likewise in such normal starting position the tension members or rack gears 15, 16 also extend upwardly from the holders 7 at a slight diverging angle of, for instance, around 15° to 25° or so to the length of straight pipe 3 in the holders 7 so as to exert a force $r_1$ on the holders 7 likewise having an upward component directed normal to the pipe in a direction to bend it around the curved shoe 2, when the rack gears 15, 16 are drawn inward.

From the force diagram in Fig. 6, it will be apparent that the total effect of the two forces $l_1$ and $r_1$ is to exert a resultant lifting force $R_1$ on the pipe holders 7 which is, in turn, applied by the holders to the pipe 3 at a lever or moment arm $d_1$ representing the distance between the respective pipe holders and the point of tangency of the straight pipe 3 to the curved shoe 2 at the medial center line $x-x$ thereof. This moment arm, however, does not remain constant throughout the bending operation but instead gradually diminishes due to the bending of the pipe around the curved shoe 2 with resultant shifting of the bending point of the pipe progressively outward along the shoe from the medial center line $x-x$ thereof. Accordingly, to maintain the necessary bending moment on the pipe 3 throughout the full bending operation from start to finish, such shortening of the moment arm would normally have to be compensated for by a gradual increase in the actuating force required to operate the bender, which would then make the bender progressively harder to operate during the bending operation and especially so during the latter stages thereof. However, with the bending apparatus according to the invention, such an increase in the force required to operate the bender is obviated and easy operation of the bender assured throughout the entire bending operation by the action of the respective links 8 and rack bars 15, 16 which, as the bending operation progresses, act much in the same manner as a toggle mechanism to progressively apply a greater proportion of their respective forces, and therefore a greater resultant force, to the pipe holders 7 in the direction of pull or bending of the pipe, i. e., normal to the portion of the pipe 3 engaged by the holders 7. This is due to the change which takes place in the angular relation between the holders 7 and the links 8 and racks 15, 16 as the bending operation progresses, the links 8 and racks 15, 16 both swinging, from their original starting angular positions $b_1$ and $c_1$ relative to the holders 7, in a direction towards and approaching the line of pull of the said holders or the pipe, as indicated by the final angular positions $b_2$ and $c_2$ of the links and racks in Fig. 7. Thus, it will be obvious that even though the force $r_2$ exerted by the respective racks 15, 16 (and therefore the operating force applied to the hand lever 24) be the same at the end of the bending operation as at the start thereof, i. e., $r_2=r_1$, the resultant bending force $R_2$ which is applied to the pipe holders 7 by the links 8 and racks 15, 16 at the end of the bending operation is considerably greater than the corresponding resultant bending force $R_1$ (Fig. 6) which is applied to the holders 7 at the start of the bending operation.

The progressively increasing resultant bending force which is thus applied to the pipe holders 7 by the links 8 and racks 15, 16 as the bending operation progresses therefore substantially compensates for the progressive shortening of the lever or moment arm of such resultant force from the original relatively long moment arm $d_1$ to the much shorter final moment arm $d_2$, so that the effective bending moment applied to the pipe 3 at any given instant during the bending operation for the same applied force to the handle 24, is at least equal to that at the start of such operation; in other words, $R_1d_1=R_2d_2$. It will be readily apparent, therefore, that the manual force which must be applied to the hand lever 24 to effect the bending of the pipe 3 remains approximately the same and in some cases actually decreases a slight amount during the bending operation. As a result the bending apparatus according to the invention is equally easy to operate from beginning to end of the bending operation.

Since the two restraining forces which are exerted by the two tension arms or racks 15, 16 on the drive gear 18 during the bending operation are applied to the gear in substantially opposite directions, they therefore tend to more or less equalize one another and thus produce very little, if any, bearing load on the drive shaft 19 during such operation. The only other bearing loads on the drive shaft 19 are those attributable to the weights of the shaft itself and the other parts carried thereby, and also to any slight pushing force that may happen to be applied to the handle 24 by the operator during the operation of the device. These other bearing loads, however, are too insignificant to be of any consequence. As a result, the bending apparatus according to the invention possesses the additional advantage of relatively low bearing loads which not only results in a more efficient operating unit but further serves to render the bending apparatus easy to operate.

By pivotally connecting the links 8 to the body member 1 in the manner indicated, at points adjacent the outer ends of the arcuate shoe portion 2, the paths of swing movement of the pipe-engaging seat portions 7' of the holders 7, during their swing movement to bend the pipe 3 around the shoe portion, are therefore caused to diverge outwardly away from the corresponding arcuate paths of travel of those portions of the pipe which are initially engaged by the seat portions 7'. As a result, the holders 7 slide outwardly along the pipe 3 during the bending thereof, thus exerting frictional forces on the pipe directed outwardly away from the center of the bend therein so as to produce a tension in the pipe. These tension-producing frictional forces therefore serve to prevent buckling of the pipe at the center of the bend since they act to continuously pull the bent portion of the pipe inwardly against, and maintain the full length of such bent portion in engagement with the arcuate shoe portion 2 at all times during the bending operation.

In the operation of the bending apparatus according to the invention, the length of straight pipe or conduit 3 to be bent is first placed in bending position within the groove 4 of the shoe 2 and resting on the seat portions 7' of the pipe holders 7 which are in their original starting position, all as shown in Fig. 1. In such starting position, the flat undersides or bottoms 14 of the pipe holders 7 are rested on the floor or other flat working surface so as to initially support the bending apparatus in upright position with the handle 24 extending in an upward direction more or less. With the ratchet pawl 30 set in its forward or pipe-bending position (as shown in Fig. 1), the handle 24 is then oscillated or swung back and forth through a series of successive strokes to pull or draw the racks 15, 16 inwardly toward one another and swing the pipe holders 7 in an arc about the link pivots 9, thus bending the pipe 3 around the shoe 2 within the groove 4 therein. During the progress of the bending operation, the force applied to the handle 24 during the power stroke thereof tends to tilt or rock the apparatus in the direction of such power stroke, as a result of which the forward pipe holder 7 located to that end of the shoe 2 in the direction of the power stroke (i. e., the right hand holder 7 in Fig. 1) is forced and held against the floor or other flat working surface which latter thus acts as a stop to limit the tilting or rocking of the apparatus. To prevent subsequent backward tilting or rocking of the apparatus during each of the subsequent backward or return strokes of the handle, the operator need merely step or press down on the portion of the pipe 3 extending outwardly beyond the said forward holder 7 so as to maintain the latter constantly in position pressed down against the floor or other flat working surface.

Upon completion of the bending operation, the ratchet pawl 30 is simply shifted to its retracting or holder returning position and the handle 24 then again swung back and forth through a series of strokes, causing the racks 15, 16 to move apart and thereby swing the pipe holders 7 outwardly away from the bent pipe so as to permit the latter to drop out of or be withdrawn from the groove 4 in the shoe 2. Should the bent pipe, however, be wedged tight in the groove 4 due to the flattening out of the pipe during the bending thereof, it will be forced out of and freed or disengaged from the groove by the engagement of the overhanging shoulder portions 13 of the holders 7 with the bent pipe 3 during the further continued outward return movement of the holders to their original starting position.

What I claim is:

1. A pipe bender comprising a body member having a curved shoe portion and carrying at its opposite ends a pair of pipe holders for engaging a length of pipe, movable support means for each holder pivotally connected to and mounting said holders on said body member for swing movement in a plane approximately parallel to the plane of said curved shoe portion, each said support means comprising link means and draw arm means converging in a direction toward the respective holder and pivotally interconnected thereadjacent, and actuating means mounted on said body member inwardly of the curved shoe portion thereof and operatively connected with said draw arm means to draw the latter inwardly of the said curved shoe portion so as to swing said holders in a direction to bend the pipe around the said shoe portion, said link means being pivoted on said body member at the opposite ends of the curved shoe portion thereof and being connected to said draw means at points to apply a pipe bending force component to said holders of progressively increasing magnitude throughout their said swing movement.

2. A pipe bender comprising a body member having a curved shoe portion and carrying at its opposite ends a pair of pipe holders for engaging a length of pipe, swinging support means for each holder pivotally connected to and mounting said holders on said body member for swing movement approximately in the plane of said curved shoe portion, each said support means comprising link means and a gear rack converging in a direction toward the respective holder and pivotally interconnected thereadjacent, and a common drive gear rotatably mounted on said body member inwardly of the said curved shoe portion thereof and gear meshed on its opposite sides with the respective gear racks to draw them inwardly of said curved shoe portion so as to swing said holders in a direction to bend the pipe around the said shoe portion, said link means being pivoted on said body member at the opposite ends of the curved shoe portion thereof and being connected to said gear racks at points to apply a pipe bending force component to said holders of progressively increasing magnitude throughout their said swing movement.

3. A pipe bender comprising a body member having a curved shoe portion and carrying at its opposite ends a pair of pipe holders for engaging a length of pipe, links pivoted on said body member adjacent the opposite ends of said shoe portion to swing in the plane thereof, said links extending outwardly from the opposite ends of said shoe portion in diverging relation to the shoe-engaging side of the pipe in said holders, gear rack bars pivotally connected to the outer ends of respective links and extending therefrom in a direction inwardly of said curved shoe portion and in diverging relation to the shoe-engaging side of the pipe in said holders, said holders being pivotally connected to respective links and rack bars adjacent the pivotal connection therebetween to swing relative to said links and rack bars in the plane of said shoe portion, and drive gear means rotatably mounted on said body member inwardly of the curved shoe portion thereof and gear meshed with said rack bars to draw them inwardly of the said shoe portion and swing said holders to bend the pipe therein around said curved shoe portion.

4. A pipe bender comprising a body member having a curved shoe portion and carrying at its opposite ends a pair of pipe holders for engaging a length of pipe, links pivoted on said body member adjacent the opposite ends of said shoe portion to swing in the plane thereof, said links extending outwardly from the opposite ends of said shoe portion in diverging relation to the shoe-engaging side of the pipe in said holders, gear rack bars pivotally connected to the outer ends of respective links and extending therefrom in a direction inwardly of said curved shoe portion and in diverging relation to the shoe-engaging side of the pipe in said holders, said holders being pivotally connected to respective links and rack bars adjacent the pivotal connection therebetween to swing relative to said links and rack bars in the plane of said shoe portion, drive gear means rotatably mounted on said body member inwardly of the curved shoe portion thereof and gear meshed with said rack bars to draw them inwardly of the said shoe portion and swing said holders to bend the pipe therein around said curved shoe portion, and actuating means comprising a reversible ratchet mechanism connected to said drive gear means for selectively rotating it in one direction to draw the rack bars inwardly and in the opposite direction to force them outwardly.

5. A pipe bender comprising a body member having an arcuate shoe portion provided with a longitudinally extending groove therein, links extending outwardly away from and pivotally connected to the opposite ends of said shoe to swing parallel to the plane of said groove, a pair of swing hooks pivotally connected at their shank ends to the outer ends of said links by pivot pins to likewise swing parallel to said plane, the hook ends of said swing hooks being engageable with a length of pipe to hold it within said groove, a pair of gear rack bars pivotally connected to respective hooks and links by said pivot pins and extending therefrom in directions inwardly of said shoe portion and approximately toward each other, said links and rack bars in their normal starting position extending away from their respective swing hooks in slightly converging and slightly diverging relation respectively to the pipe carried by said hooks, and a drive gear rotatably mounted on said body member and gear meshed with said rack bars to simultaneously draw them inwardly toward each other to thereby swing said hooks in a direction to bend the pipe carried thereby around the said shoe within the groove therein.

6. A pipe bender comprising a body member having an arcuate shoe portion provided with a longitudinally extending groove therein, links extending outwardly away from and pivotally connected to the opposite ends of said shoe to swing parallel to the plane of said groove, a pair of swing hooks pivotally connected at their shank ends to the outer ends of said links by pivot pins to likewise swing parallel to said plane, the hook ends of said swing hooks being engageable with a length of pipe to hold a pair of gear rack bars pivotally connected to respective hooks and links by said pivot pins and extending therefrom in directions inwardly of said shoe portion and approximately toward each other, said links and rack bars in their normal starting position extending away from their respective swing hooks in slightly converging and slightly diverging relation respectively to the pipe carried by said hooks, a drive gear fixed on a shaft rotatably mounted on said body member and gear meshed with said rack bars to simultaneously draw them inwardly toward each other to thereby swing said hooks in a direction to bend the pipe carried thereby around the said shoe within the groove therein, and actuating means for said drive gear comprising a ratchet gear fixed on said shaft and a hand lever pivotable on said shaft and carrying a pawl engageable with the teeth of said ratchet gear.

References Cited in the file of this patent

UNITED STATES PATENTS

| Number | Name | Date |
|---|---|---|
| 622,189 | Nall | Mar. 28, 1899 |
| 711,438 | Place et al. | Oct. 14, 1902 |
| 753,553 | Damm | Mar. 1, 1904 |
| 1,420,747 | Quinn et al. | June 27, 1922 |
| 1,639,078 | Coe | Aug. 16, 1927 |
| 2,294,510 | Nakano | Sept. 1, 1942 |
| 2,382,266 | Simonsen | Aug. 14, 1945 |
| 2,405,931 | Abramson et al. | Aug. 20, 1946 |
| 2,492,491 | McCalla | Dec. 27, 1949 |
| 2,497,500 | Hightower et al. | Feb. 14, 1950 |